(12) United States Patent
Imade

(10) Patent No.: US 6,230,127 B1
(45) Date of Patent: *May 8, 2001

(54) CODE IMAGE RECORDING APPARATUS HAVING A MICROPHONE AND A PRINTER CONTAINED IN A SAME CABINET

(75) Inventor: Shinichi Imade, Iruma (JP)

(73) Assignee: Olympus Optical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/162,872

(22) Filed: Sep. 29, 1998

(30) Foreign Application Priority Data

Oct. 9, 1997 (JP) .................................................. 9-277418

(51) Int. Cl.[7] ............................. G10L 15/26; G10L 21/06
(52) U.S. Cl. ........................................... 704/235; 704/270
(58) Field of Search .................................... 704/235, 276, 704/270

(56) References Cited

U.S. PATENT DOCUMENTS 5,923,624 * 7/1999 Groeger et al. ......................... 369/7
6,009,393 * 12/1999 Sasaki ................................ 704/258
6,043,899 * 3/2000 Morohashi et al. ................. 358/1.18

FOREIGN PATENT DOCUMENTS 0 670 555 A1 9/1995 (EP) .
0 702 351 A2 3/1996 (EP) .
0 764 944 A2 3/1997 (EP) .

* cited by examiner

Primary Examiner—Richemond Dorvil
Assistant Examiner—Angela Armstrong
(74) Attorney, Agent, or Firm—Frishauf, Holtz, Goodman, Langer & Chick, P.C.

(57) ABSTRACT

The operation mode control section sets the operation mode flag so as to prohibit any speech input operation using the microphone when the printer is driven for a printing operation and permits the speech input operation only after completing the printing operation. When a speech input operation using the microphone is specified by the speech input start operation section, the operation of the speech input processing section is prohibited as the operation mode flag is set to prohibit any speech input operation using the microphone so that the microphone is held to a stand-by state until a speech input operation using the microphone is permitted by the operation mode flag or the operation of the printer is terminated.

5 Claims, 5 Drawing Sheets

| OPERATION MODE FLAG | SPEECH INPUT OPERATION USING MICROPHONE | REPLAY OPERATING USING LOUDSPEAKER | PRINTER OUTPUT OPERATION | |
|---|---|---|---|---|
| 00000001 | AUTHORIZED | UNAUTHORIZED | UNAUTHORIZED | ONLY SPEECH INPUT OPERATION IS ALLOWED BY USING THE BUILT-IN MICROPHONE |
| 00000010 | UNAUTHORIZED | AUTHORIZED | UNAUTHORIZED | ONLY LOUDSPEAKER OUTPUT OPERATION IS ALLOWED |
| 00000100 | UNAUTHORIZED | UNAUTHORIZED | AUTHORIZED | ONLY PRINTER OUTPUT OPERATION IS ALLOWED |
| 00001000 | AUTHORIZED | AUTHORIZED | AUTHORIZED | ALL OPERATIONS ARE ALLOWED |

CODE IMAGE RECORDING APPARATUS HAVING A MICROPHONE AND A PRINTER CONTAINED IN A SAME CABINET

BACKGROUND OF THE INVENTION

This invention relates to a code image recording apparatus for recording a speech entered through a microphone by printing it on a predetermined printing medium in the form of an optically readable code image.

The assignee of the present patent application has proposed a recording apparatus for recording a speech by printing it on a predetermined printing medium in the form of an optically readable code image of dot codes in EP 0,670,555 A1 (U.S. Ser. No. 08/407,018 now issued as U.S. Pat. No. 5,896,403).

Figure 1A:
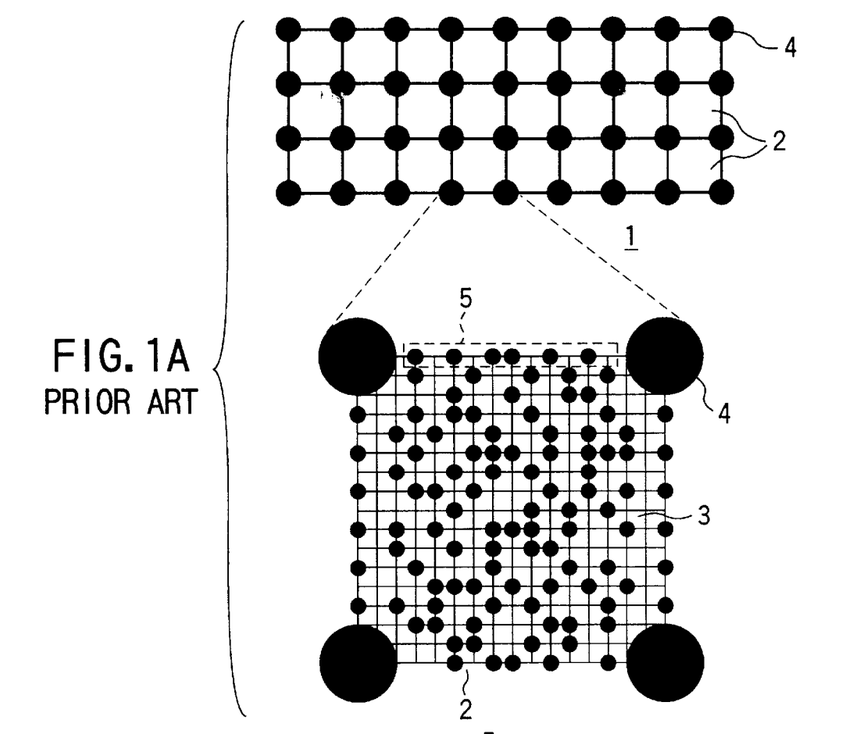
FIG. 1A is a schematic illustration of a physical format of dot codes to be printed on a printing medium for the purpose of the invention.
Figure 1B:
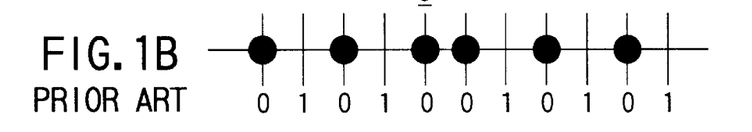
FIG. 1B is a schematic illustration of the block address of the dot code of FIG. 1A.

FIGS. 1A and 1B of the accompanying drawing schematically illustrate the configuration of the physical format of dot codes to be used for the proposed recording apparatus. The code pattern 1 comprises a plurality of blocks 2 arranged two-dimensionally on a side by side basis. Each block 2 by turn comprises a data area 3, markers 4 and a block address pattern 5.

The data area 3 contains white dots and black dots representing respective data values of "0s" and "1s" that are assigned to each block as speech data and arranged according to a predetermined format of arrangement to produce a white dot image or a black dot image. The markers 4 are black markers arranged at the four corners of the block 12 to provide a reference point for detecting each dot in the data area 3, each of the markers 4 being formed by a certain number of consecutively arranged black dots. The block address pattern 5 is arranged between adjacently located markers 4 to make the block 2 discriminable from other blocks 2 and contains white dots and black dots representing respective data values of "0s" and "1s" that are assigned to each block as address data including an error detecting or error correcting code. The vertical and horizontal lines connecting the dots in the drawing are used for the ease of understanding and they do not exist in real code images.

A system using dot codes arranged with the above described physical format provides an advantage that the original data can be restored by rearranging the data of the blocks according to their respective addresses if all the dot codes of the data covers an area greater than the area that can be taken by the solid state image sensing device of the image reader or, differently stated, if the entire dot codes of the data cannot be picked up by a single shot, provided that the address of each of the blocks is contained in any of the images taken by the image reader. Therefore, such a dot code system can store a huge volume of data on a single sheet of paper in a manner that no known one-dimensional or two-dimensional bar code system can ever do, and as a result so that speech data can be transmitted or transported in a simple manner by means of a recording medium such as paper. Thus, the dot code system may have a wide variety of applications that are not conceivable with any known code systems.

The code image recording apparatus may be an ordinary printer or a label printer adapted to print and record optically readable dot codes continuously on label-like sheets of paper being fed also continuously along a given direction.

The use of a label printer for a code image recording apparatus is very promising because it is portable and easy to use and hence provides a broad opportunity of utilization.

However, label printers or not, known code image recording apparatuses have problems to be overcome before they get a high market value.

More specifically, with a code image recording apparatus of the type under consideration comprising a microphone for speech input, code image converting means for encoding the input speech and converting it into a code image of dot codes and a printer for printing and recording the code image obtained by the code image converting means as optically readable image contained in a single cabinet, the microphone picks up the noise emitted by the printer to adversely affect the input speech and remarkably degrade the quality of speech if the speech input operation of the microphone and the code image printing operation of the printer take place concurrently.

BRIEF SUMMARY OF THE INVENTION

In view of the above identified problem, it is therefore the object of the present invention to provide a code image recording apparatus that can minimize the degradation of the quality of the speech input through the microphone given rise to by a code image printing operation of the printer.

According to a first aspect of the present invention, there is provided a code image recording apparatus comprising:

a microphone for inputting a speech;

code image converting means for converting the speech input by the microphone into a code image of encoded data arranged according to a predetermined format;

a printer for printing the code image converted by the code image converting means on a predetermined printing medium as an optically readable image, the microphone, the code image converting means and the printer being contained in a single cabinet;

operation mode setting means for setting a speech input mode adapted to make the microphone input a speech to be converted into a code image by the code image converting means and a printing/recording mode adapted to make the printer print and record the code image converted by the code image converting means on a printing medium; and mode selection control means for controlling the operation mode setting means so as to set only one of the above operation modes and prohibiting it to set the other operation mode.

According to a second aspect of the present invention, there is provided a code image recording apparatus comprising:

a microphone for inputting a speech;

code image converting means for converting the speech input by the microphone into a code image of encoded data arranged according to a predetermined format;

a printer for printing the code image converted by the code image converting means on a predetermined printing medium as an optically readable images, the microphone, the code image converting means and the printer being contained in a single cabinet;

operation mode setting means for setting a speech input mode adapted to make the microphone input a speech to be converted into a code image by the code image converting means and a printing/recording mode adapted to make the printer print and record the code image converted by the code image converting means on a printing medium; and mode selection control means for prohibiting the operation mode setting means to set the printing/ recording mode if the latter has set the speech input mode.

According to a third aspect of the present invention, there is provided a code image recording apparatus comprising:

a microphone for inputting a speech;

code image converting means for converting the speech input by the microphone into a code image of encoded data arranged according to a predetermined format;

a printer for printing the code image converted by the code image converting means on a predetermined printing medium as an optically readable image, the microphone, the code image converting means and the printer being contained in a single cabinet;

operation mode setting means for setting a speech input mode adapted to make the microphone input a speech to be converted into a code image by the code image converting means and a printing/recording mode adapted to make the printer print and record the code image converted by the code image converting means on a printing medium; and mode selection control means for prohibiting the operation mode setting means to set the speech input mode if the latter has set the printing/recording mode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

Now, the present invention will be described by referring to the accompanying drawings that illustrate a preferred embodiment of the invention.

Figure 2:
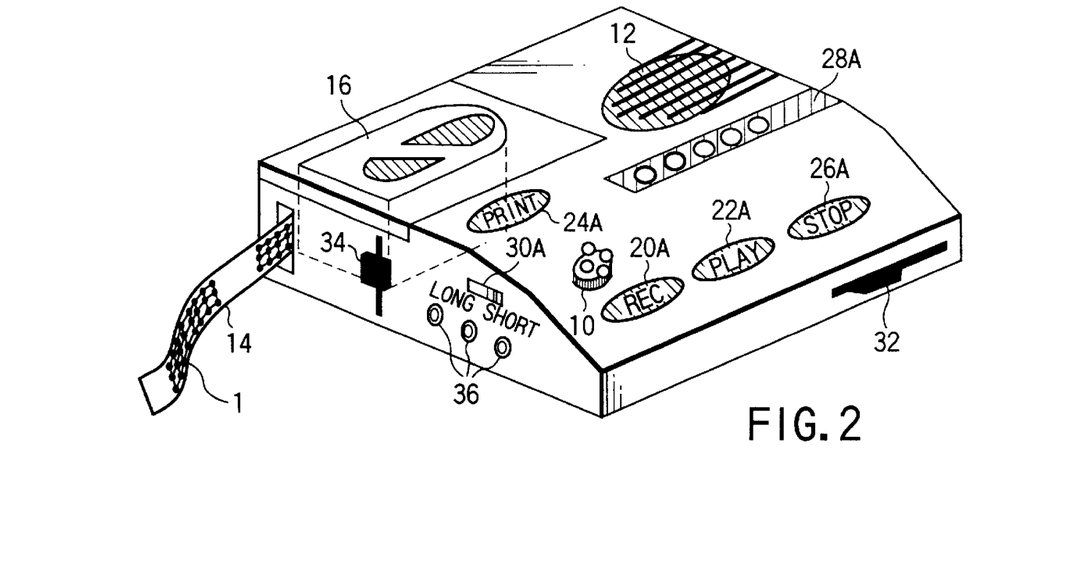
FIG. 2 is a schematic perspective view of an embodiment of code image recording apparatus according to the invention.
Figure 3:
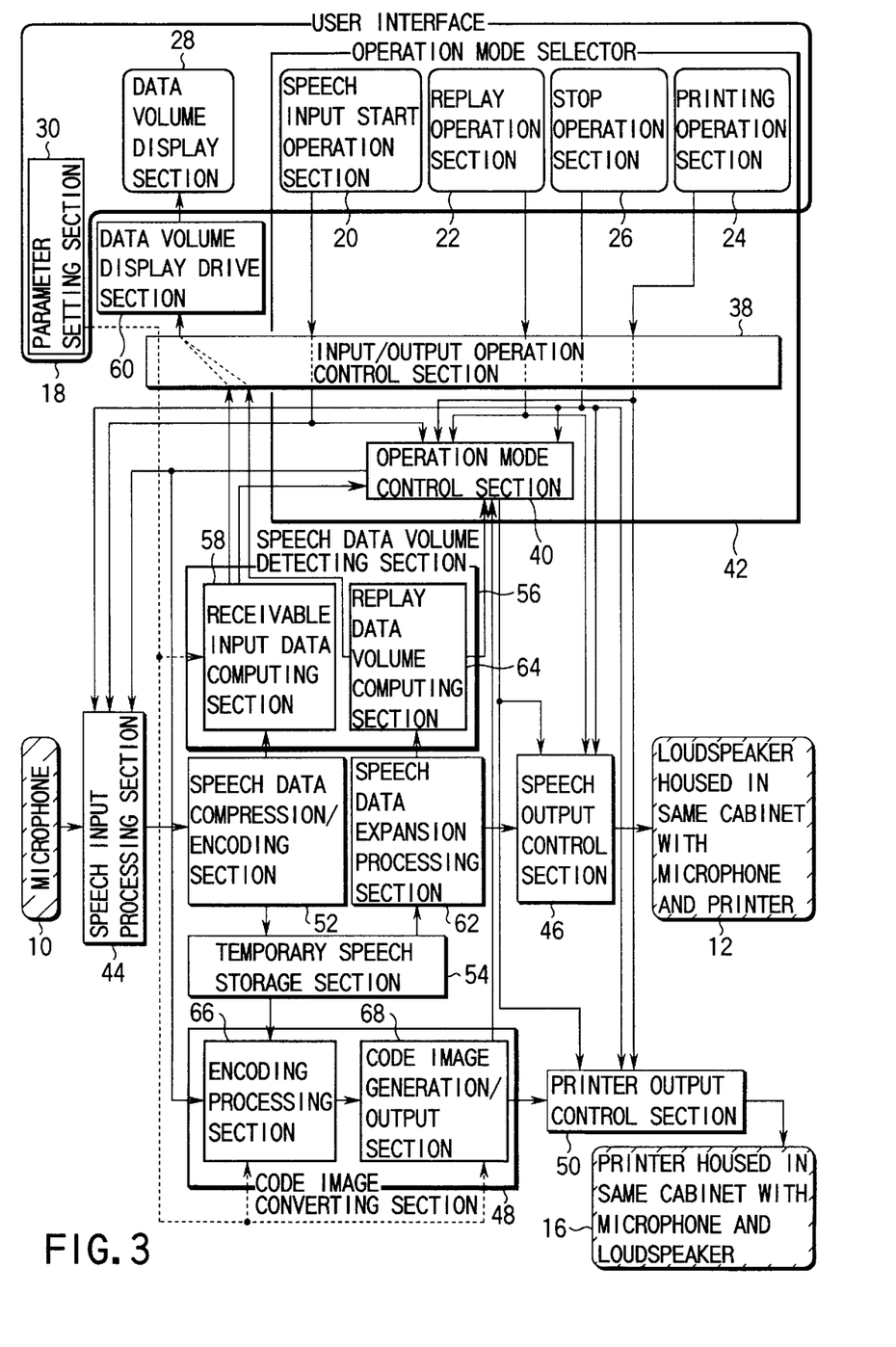
FIG. 3 is a schematic block diagram of the embodiment of code image recording apparatus of FIG. 2.

FIG. 2 is a schematic perspective view of an embodiment of code image recording apparatus according to the invention and FIG. 3 is a schematic block diagram of the embodiment of code image recording apparatus of FIG. 2. The code image recording apparatus comprises a microphone 10 for speech input, a loudspeaker 12 for reproducing the input speech for the purpose of confirmation and a printer 16 for printing a dot code pattern 1 on a label-like printing medium 14, the microphone 10, the loudspeaker 12 and the printer 16 being contained in a single cabinet.

The code image recording apparatus is provided with a speech input start operation section 20, a replay operation section 22, a printing operation section 24, a stop operation section 26, a data volume display section 28 and a parameter setting section 30 arranged on the top and lateral sides of the cabinet. The speech input start operation section 20 is in fact a "REC" button 20A for starting a speech input operation through the microphone 10 whereas the replay operation section 22 is in fact a "PLAY" button 22A for starting a speech reproducing operation through the loudspeaker 12. The printing operation section 24 and the stop operation section refer respectively to a "PRINT" button 24A for starting an operation of printing a dot code pattern 1 by means of the printer 16 and a "STOP" button 26A for terminating the current operation. The data volume display section 28 is in fact a volume of receivable input/progress of speech reproduction indicator 28A typically comprising five LEDs for indicating the volume of receivable input determined by the preselected total volume of speech input and the volume of input received by microphone 10 and the progress of speech reproduction through the loudspeaker 12.

The parameter setting section 30 includes a long/short mode selector switch 30A for specifying the mode of recording a dot code pattern 1 on a label-like printing medium 14, a total volume of speech input preselecting section and a parameter input section for entering parameters necessary for preparing a dot code pattern 1, although the parameter setting section 30 may alternatively comprise a ROM for storing parameters so that the user may not be required to enter parameters. The long mode and the short mode described above as mode of recording the dot code pattern 1 refer to the respective lengths of the parts to be used when a dot code pattern is divided into a plurality of parts with an interval arranged between any two successive parts so that the dot code pattern may be printed on so many label-like pieces of printing medium 14. For example, the long mode may refer to the use of A4 size (of the A Series Standard used in Japan) sheets of paper arranged vertically and applying label-like sheets of printing medium thereto horizontally, whereas the short mode may refer to the use of blank post cards arranged horizontally (or vertically) and applying label-like sheets of printing medium thereto horizontally.

Reference numeral 32 in FIG. 2 denotes a volume control for controlling the volume with which the input speech is sounded for replaying and reference numeral 34 denotes a cutter lever for operating the built-in cutter to cut and separate the printed label-like sheet of printing medium 14 from the unprinted sheets. Reference numeral 36 denotes a number of jacks to be used for externally inputting/outputting a speech.

The speech input start operation section 20, the replay operation section 22, the printing operation section 24 and the stop operation section 26 operate as part of operation mode selector 42 with an input/output operation control section 38 and an operation mode control section 40. The operation signals from the speech input start operation section 20, the replay operation section 22, the printing operation section 24 and the stop operation section 26 are entered to the operation mode control section 40 by way of the input/output operation control section 38. The operation mode control section 40 controls the operation of each of speech input processing section 44, speech output control section 46, code image converting section 48 and printer output control section 50 according to the present operation mode and the corresponding operation signal it receives as will be described in detail hereinafter.

The speech input control section 44 performs processing operations including amplification, filtering and A/D conversion on the speech signal input through the microphone 10. The speech input processing section 44 is made ready for starting its operation by an operation signal from the speech input start operation section 20 and for stopping its operation by an operation signal from the stop operation section 26, although it does not start its operation until authorized by the operation mode control section 40.

The digital speech data output from the speech input processing section 44 is compressed/encoded for every speech frame unit of 30 msec by a speech data compression/encoding section 52 and stored in a temporary data storage section 54. Speech data volume detecting section 56 has a receivable input data computing section 58 that computes the speech volume that can still be input into the recording apparatus on the basis of the number of frames compressed by the speech data compression/encoding section 52 and the number of frames corresponding to the total speech volume to be input set by the parameter setting section 30 and sends the outcome of the computation to a data volume display drive section 60 by way of the input/output operation control section 38. The data volume display drive section 60 energize the five LEDs of the volume of receivable input/progress of speech reproduction indicator 28A to display the speech volume that can still be received by the recording apparatus.

The speech output control section 46 performs processing operations including amplification, filtering and D/A conversion on the speech data to be reproduced from the loudspeaker 12. The speech output control section 46 is made ready for starting its operation by an operation signal from the replay operation section 22 and stopping its operation by an operation signal from the stop operation section 26, although it does not start its operation until authorized by the operation mode control section 40.

The speech data sent to the speech output control section 46 is a data obtained by expanding the compressed/encoded data stored in the temporary data storage section 54 by means of a speech data expansion processing section 62. At this time, a data indicating the number of frames subjected to the expansion processing operation of the speech data expansion processing section 62 is fed to replay data volume computing section 64 of the speech data volume detecting section 56 from the speech data expansion processing section 62. The replay data volume computing section 64 determines by computation the volume of data reproduced from data stored in the temporary data storage section 54. The outcome of the computing operation is then fed to the data volume display drive section 60 by way of the input/output operation control section 38 so that the progress of speech reproduction is indicated as the five LEDs of the volume of receivable input/progress of speech reproduction indicator 28A are energized.

The printer output control section 50 controls the printer 16 to print the code image of the dot codes converted by the code image converting section 48. The printer output control section 50 is made ready for starting its operation by an operation signal from the printing operation section 24 and stopping its operation by an operation signal from the stop operation section 26, although it does not start its operation until authorized by the operation mode control section 40.

The code image converting section 48 that feed the printer output control section 50 with a code image of dot codes comprises an encoding processing section 66 for encoding compressed/encoded speech data stored in the temporary data storage section 54 and a code image generation/output section 68 for converting coded data into a code image and outputting the generated code image. The operation of the encoding processing section 66 is controlled by the operation mode control section 40. Parameters including the compression ratio, the resolution, the number of block rows and the length of the parts obtained by dividing the dot codes necessary for encoding and outputting a code image are set by means of the parameter setting section 30.

The code image generation/output section 68 has a memory (not shown) for storing the generated code image so that a same dot code pattern 1 can be duplicatively reproduced simply by operating the printing operation section 24.

Now, the operation of the embodiment of code image recording apparatus having the above described configuration will be described below.

Figure 4:
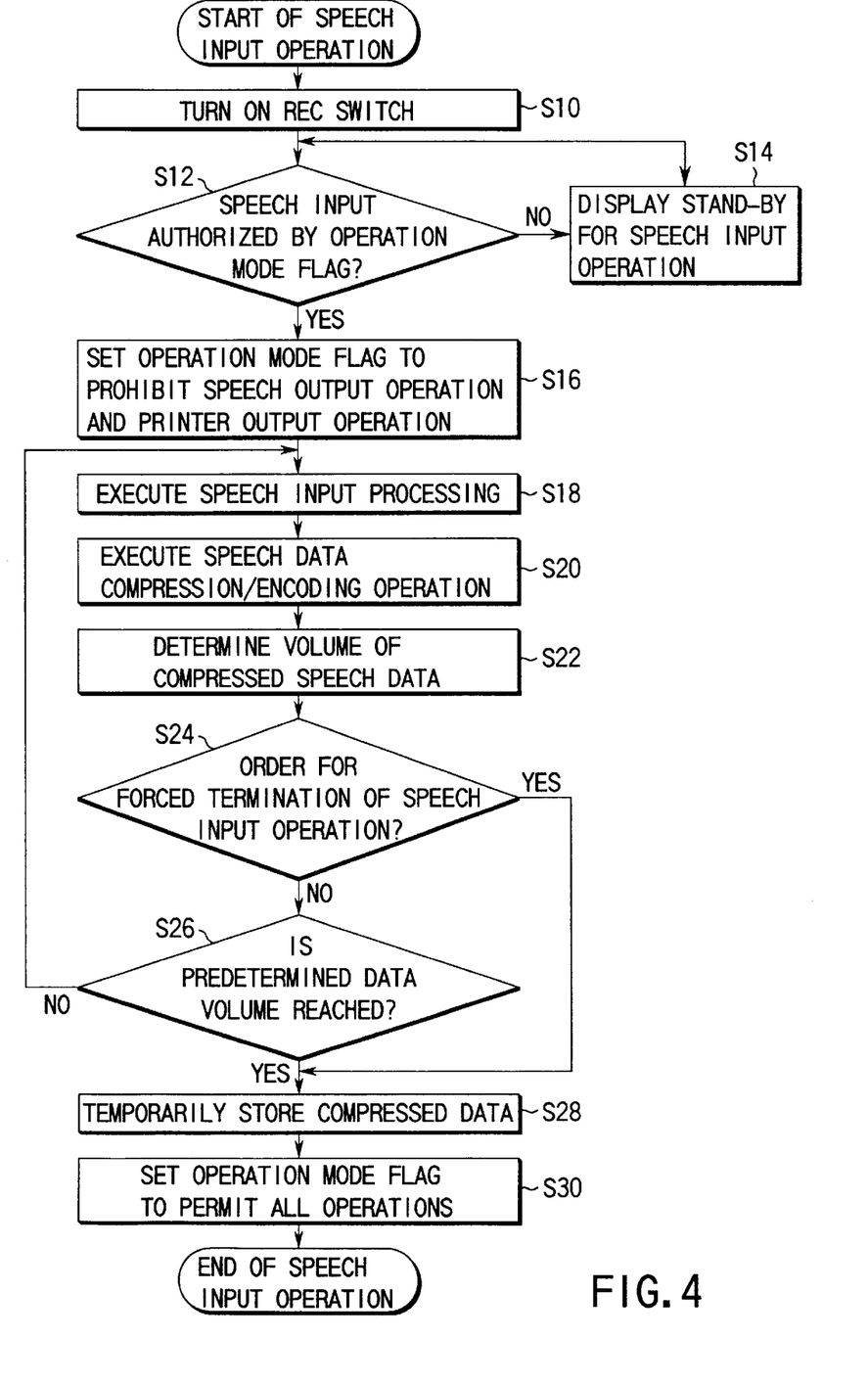
FIG. 4 is a flow chart of the speech input operation of the embodiment of FIG. 2.
Figure 5:
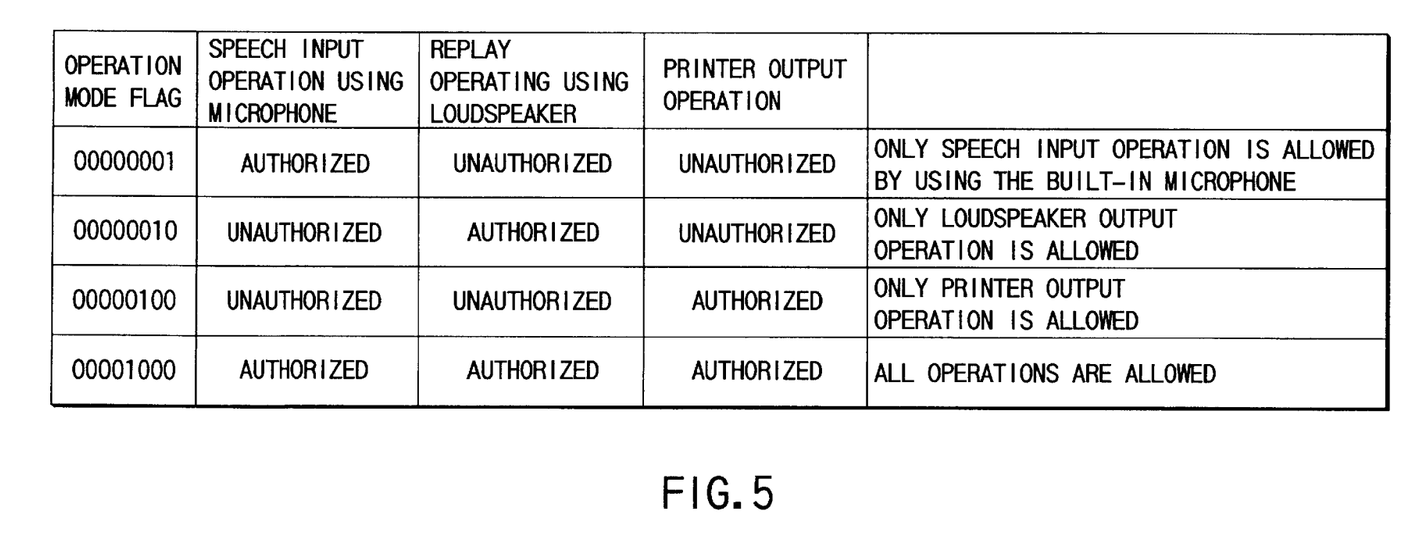
FIG. 5 is a chart illustrating operation mode flags to be used for the embodiment of FIG. 2.

FIG. 4 is a flow chart of the speech input operation of the embodiment. As the "REC" button 20A of the speech input start operation section 20 is depressed (Step S10), the operation mode control section 40 reads the current status of the operation mode flag and determines if a speech input operation using the microphone 10 is permitted or not (Step S12). As shown in FIG. 5, the operation mode flag is a 8-bit data, where bit "1" indicates if a speech input operation using the built-in microphone 10 is permitted or not and bit "2" indicates if a speech output operation using the loudspeaker 12 is permitted or not, whereas bit "3" indicates if an operation of outputting the dot code pattern that corresponds to the input speech to the printer 16 is permitted for printing or not and bit "4" indicates if the overall operation of the code image recording apparatus is authorized or not. Thus, "00000001" indicates a state where only a speech input operation using the microphone 10 is authorized and "00000010" indicates a state where only a speech reproducing operation using the loudspeaker 12 is authorized, whereas "00000100" indicates a state where only an operation of outputting a dot code pattern for printing is authorized and "00001000" indicates a states where all the above operations are authorized and can be conducted simultaneously.

In an operation mode where no speech input operation using the microphone 10 is authorized, the stand-by state is typically displayed to the user in the form of an error message (not shown) (Step S14) and the processing operation returns to Step S12. Thus, no speech input is made while the printer 16 is operating so that the noise emitted by the printer is prevented from picked up by the microphone 10 when the printer is operating.

On the other hand, in an operation mode where a speech input operation using the microphone 10 is authorized, the operation mod e flag i s set to "00000001" to prohibit any speech output from the loudspeaker 12 and any printing output operation of the printer 16 (Step S16). Thus, the printer 16 is held to a stand-by state when a speech input operation is in progress at the microphone 10 so that no operation noise of the printer 16 may be picked up by the microphone 10.

The operation mode control section 40 authorizes the speech input processing section 44 to carry but an input processing operation on the speech signal input through the microphone 10 (Step T18). The speech data compression/encoding section 52 compresses and encodes the speech data from the speech input processing section 44 (Step S20) and the receivable input data computing section 58 determines the speech volume compressed by the speech data compression/encoding section 52 and causes the volume of receivable input/progress of speech reproduction indicator 28A of the data volume display section 28 to display the speech volume that can still be input into the recording apparatus by means of the data volume display drive section 60 (Step 522).

The operation mode control section 40 checks if an order for forced termination of speech input operation is given by the user by depressing the "STOP" button 26A of the stop operation section 26 during the speech input operation (Step S24) and, if such an order is given, it proceeds to Step S28, which will be discussed hereinafter. If an order for forced termination of speech input operation is not given, it determines if the volume of the data already input has got to the data volume preselected by the parameter setting section 30 or not on the basis of the outcome of the computation of the receivable input data computing section 58 (Step S26) and returns to Step S18 if the volume of the data already input has not got to the preselected volume.

If, on the other hand, it is found that the volume of the data already input has reached the preselected data volume and if it is found in Step S24 that an order for forced termination of speech input operation is given, the speech data that have been compressed/encoded by the speech data compression/ encoding section 52 are stored in the temporary data storage section 54 (Step S28). Then, the operation mode control section 40 sets the operation mode flag to "00001000" to indicate that all intended operations of the code image recording apparatus are authorized (Step S30) before terminating the current speech input operation.

Figure 6:
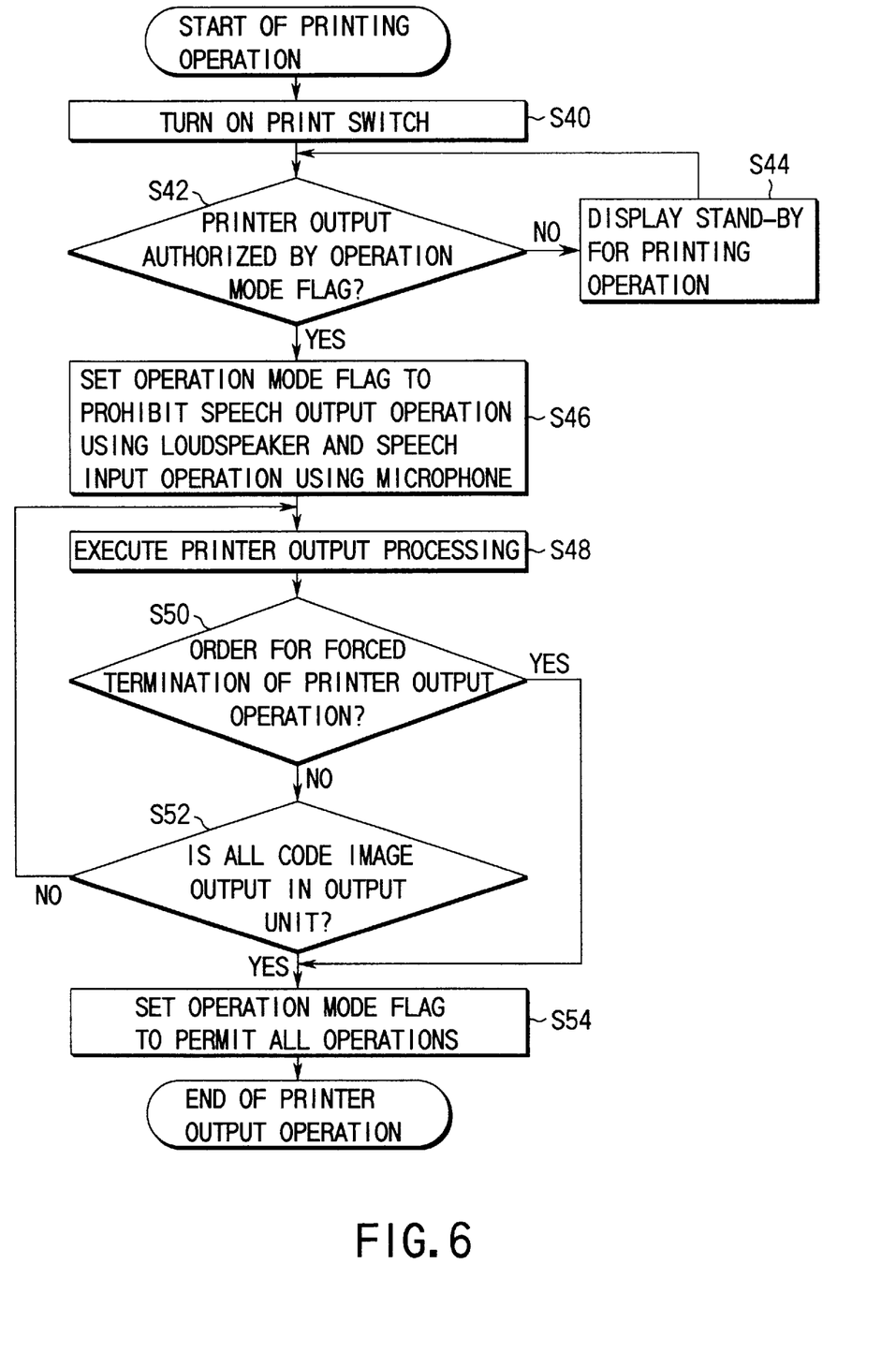
FIG. 6 is a flow chart of the printing operation of the embodiment of FIG. 2.

FIG. 6 is a flow chart the printing operation of the embodiment. Assume here that the processing operation of encoding the data stored in the temporary data storage section 54 and that of generating a code image of the code image converting section 48 have been completed.

As the "PRINT" button 24A of the printing operation section 24 is depressed (Step S40), the operation mode control section 40 reads the current status of the operation mode flag to determine if a printer output operation is authorized or not (Step S42). If it is found that a printer output operation is no authorized, the stand-by state is typically displayed to the user in the form of an error message (not shown) (Step S44) and the processing operation returns to Step S42. Thus, the printer 16 does not operate while a speech is being input through the microphone 10 so that no noise is emitted by the printer and hence the microphone 10 would not pick up any printing noise.

On the other hand, in an operation mode where a printer output operation is authorized, the operation mode flag is set to "00000100" to prohibit any speech output from the loudspeaker 12 and any speech input operation through the microphone 10 (Step S46). Thus, the speech input processing section 44 is held to a stand-by state when the printer 16 is operating to prevent any undesired printing noise from being picked up by the microphone 10.

The operation mode control section 40 authorizes the printer output control section 50 to carry out a printer output processing operation of printing a code image of dot codes sent from the code image converting section 48 on a label-like printing medium 14 by means of the printer 26 (Step S48).

The operation mode control section 40 checks if an order for forced termination of printer output operation is given by the user by depressing the "STOP" button 26A of the stop operation section 26 during the printer output processing operation (Step S50) and, if such an order is given, it proceeds to Step S54, which will be discussed hereinafter. If an order for forced termination of printer output operation is not given, it determines if all the code image expressed in terms of output unit and generated by the code image generation/output section 68 has been output or not (Step S52) and returns to Step S48 if all the code image has not been output.

If, on the other hand, it is found that all the code image expressed in terms of output unit has been output, the operation mode control section 40 sets the operation mode flag to "00001000" to indicate that all intended operations of the code image recording apparatus are authorized (Step S54) before terminating the current printing operation.

Thus, as described above in detail, a speech input operation of the microphone 10 and a code image printing operation of the printer 16 do not take place concurrently with a code image recording apparatus according to the invention so that the risk of degrading the quality of the speech input through the microphone 10 can be minimized.

While the present invention is described above by referring to a preferred embodiment, the present invention is not limited thereto and the above embodiment can be altered or modified in many different ways without departing from the scope of the invention.

The present invention may be summarized as follows.

(1) A code image recording apparatus comprising:

a microphone for inputting a speech;

code image converting means for converting the speech input by the microphone into a code image of encoded data arranged according to a predetermined format;

a printer for printing the code image converted by the code image converting means on a predetermined printing medium as an optically readable image, the microphone, the code image converting means and the printer being contained in a single cabinet;

operation mode setting means for setting a speech input mode adapted to make the microphone input a speech to be converted into a code image by the code image converting means and a printing/recording mode adapted to make the printer print and record the code image converted by the code image converting means on a printing medium; and mode selection control means for controlling the operation mode setting means so as to set only one of the above operation modes and prohibiting it to set the other operation mode.

With the above arrangement, when the microphone is contained in a cabinet containing the printer, the printing/ recording mode where undesired noise is generated is never selected concurrently with the speech input mode in a same operation period to ensure the quality of speech input.

(2) A code image recording apparatus comprising:

a microphone for inputting a speech;

code image converting means for converting the speech input by the microphone into a code image of encoded data arranged according to a predetermined format;

a printer for printing the code image converted by the code image converting means on a predetermined printing medium as an optically readable image, the microphone, the code image converting means and the printer being contained in a single cabinet;

operation mode setting means for setting a speech input mode adapted to make the microphone input a speech to be converted into a code image by the code image converting means and a printing/recording mode adapted to make the printer print and record the code image converted by the code image converting means on a printing medium; and mode selection control means for prohibiting the operation mode setting means to set the printing/recording mode if the latter has set the speech input mode.

With the above arrangement, when the microphone is contained in the cabinet of the code image recording apparatus and the speech input operation mode has priority, any noise other than the speech has to be prevented from being picked up by the microphone in. order to ensure a high sound quality for the speech. In view of the fact that the printer that emits mechanical noises provides the largest noise source when operating, the selection of the printing/recording mode should be prohibited to completely prevent the mechanical noise that can be emitted by the printer from being picked up by the microphone in order to ensure input of a high quality speech so long as the speech input mode is selected to allow a speech input operation to be performed. Then, the anti-noise/anti-vibration measures that may be required when the printer is driven to operate during a speech input operation will not be necessary to, so that the cost of the code image recording apparatus can be reduced.

(3) A code image recording apparatus according to (2) above, further comprising:

speech data volume detecting means for detecting the volume of the speech data for the speech input in the speech input mode and determining if the detected volume is short of a predetermined data volume or not, and wherein the mode selection control means releases the set speech input mode to allow the set of a printing/recording mode when the speech data volume detecting means determines that the input speech data volume detected by it has got to the predetermined data volume.

With a code image recording apparatus comprising a microphone for speech input contained in the same cabinet of the recording apparatus, the speech input operation may be temporarily suspended so that the volume of the speech recorded by the recording apparatus is reflected only by the volume of the speech data stored in it. Thus, the duration of the operation of recording the speech data can be determined for certain by detecting the volume of the stored speech data and determining if the volume has got to the preselected volume level so that the printing/recording operation mode and hence the operation of driving the printer may be prohibited reliably. Then, the risk of the microphone of picking up the mechanical noise of the printer can be minimized to ensure the quality of speech input. Additionally, the anti-noise/anti-vibration measures that may be required when the printer is driven to operate during a speech input operation will not be necessary, so that the cost of the code image recording apparatus can be reduced.

(4) A code image recording apparatus comprising:

a microphone for inputting a speech;

code image converting means for converting the speech input by the microphone into a code image of encoded data arranged according to a predetermined format;

a printer for printing the code image converted by the code image converting means on a predetermined printing medium as an optically readable image, the microphone, the code image converting means and the printer being contained in a single cabinet;

operation mode setting means for setting a speech input mode adapted to make the microphone input a speech to be converted into a code image by the code image converting means and a printing/recording mode adapted to make the printer print and record the code image converted by the code image converting means on a printing medium; and mode selection control means for prohibiting the operation mode setting means to set the speech input mode if the latter has set the printing/recording mode.

With the above arrangement, when the microphone is contained in the cabinet of the code image recording apparatus and the printing/recording operation mode has priority, any noise other than the speech has to be prevented from being picked up by the microphone in order to ensure a high sound quality for the speech. In view of the fact that the printer that emits mechanical noises provides the largest noise source when operating, the selection of the speech input mode should be prohibited to completely prevent the mechanical noise emitted by the printer from being picked up by the microphone in order to ensure input of a high quality speech by prohibiting any speech input operation so long as the printing/recording mode is selected. Then, the anti-noise/anti-vibration measures that may be required when the printer is driven to operate during a speech input operation will not be necessary, so that the cost of the code image recording apparatus can be reduced.

(5) A code image recording apparatus according to (4) above, further comprising:

code image volume detecting means for detecting the volume of the code image printed and recorded in the printing/recording mode and determining if the detected volume is short of a predetermined volume or not, and wherein the mode selection control means releases the set printing/recording mode to allow the set of a speech input mode when the code image volume detecting means determines that the volume of the printed and recorded code image has got to the predetermined data volume.

With a code image recording apparatus comprising a microphone for speech input contained in the same cabinet of the recording apparatus, the code image printing/recording operation may be temporarily suspended so that the volume of the code image printed and recorded by the printer is reflected only by the volume of the code image stored in it. Thus, the duration of the operation of printing and recording the code image can be determined for certain by detecting the volume of the stored code image data and determining if the volume has got to the preselected volume level so that the speech input operation mode and hence the operation of driving the microphone may be prohibited reliably. Then, the risk of the microphone of picking up the mechanical noise of the printer can be minimized to ensure the quality of speech input. Additionally, the anti-noise/anti-vibration measures that may be required when the printer is driven to operate during a speech input operation will not be necessary, so that the cost of the code image recording apparatus can be reduced.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A code image recording apparatus comprising:

a microphone for inputting speech;

by code image converting means for converting the speech input by said microphone into a code image of encoded data arranged according to a predetermined format;

a printer for printing said code image converted by said code image converting means on a predetermined printing medium as an optically readable image;

operation mode setting means for setting one of: (i) a speech input mode adapted to cause said microphone to input the speech to be converted into the code image by said code image converting means, and (ii) a printing/recording mode adapted to cause said printer to print and record the code image converted by said code image converting means on the predetermined printing medium; and mode selection control means for controlling said operation mode setting means so as to set only one of the speech input mode and the printing/recording mode and to prohibit setting of the other one of the speech input mode and the printing/recording mode;

wherein said microphone, said code image converting means and said printer are contained in a single cabinet.

2. A code image recording apparatus comprising:

a microphone for inputting speech;

code image converting means for converting the speech input by said microphone into a code image of encoded data arranged according to a predetermined format;

a printer for printing said code image converted by said code image converting means on a predetermined printing medium as an optically readable image;

operation mode setting means for setting one of: (i) a speech input mode adapted to cause said microphone to input the speech to be converted into the code image by said code image converting means, and (ii) a printing/recording mode adapted to cause said printer to print and record the code image converted by said code image converting means on the predetermined printing medium; and mode selection control means for prohibiting said operation mode setting means to set the printing/recording mode if the operation mode setting means has set the speech input mode;

wherein said microphone, said code image converting means and said printer are contained in a single cabinet.

3. A code image recording apparatus according to claim 2, further comprising:

speech data volume detecting means for detecting a volume of the speech data input in the speech input mode and for determining if the detected volume has reached a predetermined data volume, and wherein when said speech data volume detecting means determines that the input speech data volume has reached the predetermined data volume, said mode selection control means stops prohibiting said operation mode setting means from setting the printing/recording mode and enables said operation mode setting means to set the printing/recording mode.

4. A code image recording apparatus comprising:

a microphone for inputting speech;

code image converting means for converting the speech input by said microphone into a code image of encoded data arranged according to a predetermined format;

a printer for printing said code image converted by said code image converting means on a predetermined printing medium as an optically readable image;

operation mode setting means for setting one of: (i) a speech input mode adapted to cause said microphone to input the speech to be converted into the code image by said code image converting means, and (ii) a printing/recording mode adapted to cause said printer to print and record the code image converted by said code image converting means on the predetermined printing medium; and mode selection control means for prohibiting said operation mode setting means to set the speech input mode if the operation mode setting means has set the printing/recording modes;

wherein said microphone, said code image converting means and said printer are contained in a single cabinet.

5. A code image recording apparatus according to claim 4, further comprising:

code image volume detecting means for detecting a volume of the code image printed and recorded in the printing/recording modes and for determining if the detected volume has reached a predetermined volume, and wherein when said code image volume detecting means determines that the printed and recorded code image volume has has reached the predetermined data volume, said mode selection control means stops prohibiting said operation mode setting means from setting the speech input mode and enables said operation mode setting means to set the speech input mode.

* * * * *